Dec. 23, 1969    J. N. CARTER    3,485,311

ADJUSTABLE DRILL ASSEMBLY

Filed July 28, 1967

INVENTOR.
JOHN N. CARTER
BY
*Isler & Ornstein*
ATTORNEYS

United States Patent Office 3,485,311
Patented Dec. 23, 1969

3,485,311
ADJUSTABLE DRILL ASSEMBLY
John N. Carter, Timberidge Trail,
Gates Mills, Ohio 44040
Filed July 28, 1967, Ser. No. 656,809
Int. Cl. E21b 9/00; E21c 13/00
U.S. Cl. 175—382                                 8 Claims

ABSTRACT OF THE DISCLOSURE

The invention is concerned with a drill assembly comprising a rotatable adapter having a circular cam in eccentric relation to the adapter, a drill mounted on the adapter and having an opening into which the cam extends, and means permitting the drill to be rotated in relation to the cam whereby to cause the position of the drill to be adjusted laterally in relation to the adapter for the purpose of compensating for wear of the drill and drilling a larger hole.

---

The present invention relates generally to drill assemblies, but has reference more particularly to diamond core drill assemblies.

A primary object of the invention is to provide a core drill assembly of the character described, having means incorporated therein for compensating for wear of the drill.

Another object of the invention is to provide a core drill assembly of the character described, in which the compensation for wear of the drill is effected by incorporating in the assembly means for causing the drill to be adjusted laterally with respect to the driving axis of the drill, whereby the drill is caused to drill a larger hole.

A further object of the invention is to provide a core drill assembly of the character described, which includes a driving element having a cam in offset relation to the axis of the driving element, and a drill rotatable about the cam for the purpose of causing lateral adjustment of the drill in relation to said said driving axis.

Other objects and advantages of my invention will be apparent during the course of the following description.

Figure 1:
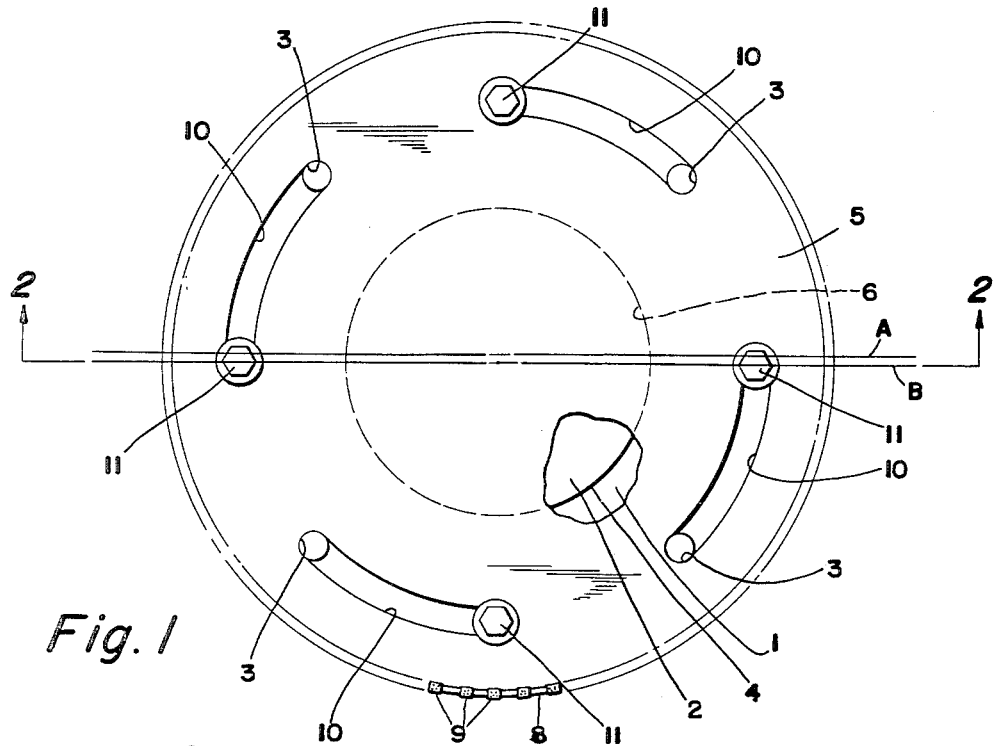
Figure 2:
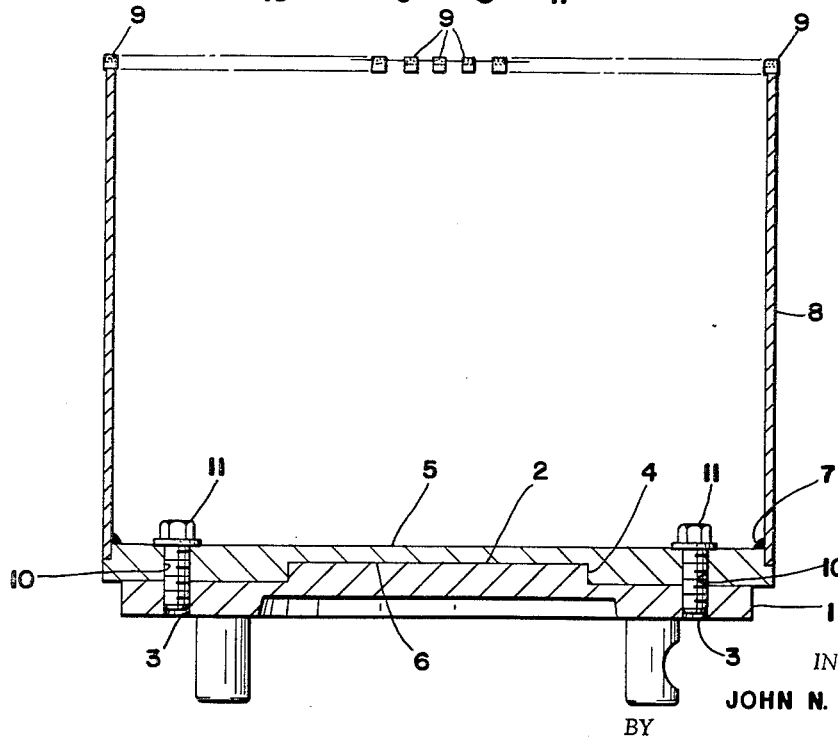

In the accompanying drawing forming a part of this specification, and in which like numerals are employed to designate like parts throughout the same, FIG. 1 is a top plan view of a core drill assembly embodying the invention, and with a portion broken away to show the underlying structure, and FIG. 2 is a transverse cross-sectional view of the assembly, taken on the line 2—2 of FIG. 1.

Referring more particularly to the drawing, reference numeral 1 designates a circular spindle adapter which is adapted to be driven about its axis by means (not shown), and which is provided with a raised circular portion or boss 2, the axis of which is offset slightly from the axis of the adapter 1. This raised portion 2 will hereinafter be referred to as a cam.

The adapter 1 is also provided with circumferentially spaced threaded openings 3, there being eight such openings in the example shown, which are spaced apart uniformly. The axes of these openings are on a circle which is concentric with the edge 4 of the cam 2.

The core drill assembly further includes a circular base plate 5 which is concentric with the portion 1 of the adapter and has a circular recess or opening 6 in its lower surface into which the cam 2 fits, this recess having its center offset from the center of the base plate 5 to the same extent that the axis of the cam or boss 2 is offset from the axis of the adapter 1.

The base plate 5 has welded thereto, as at 7, a cylindrical or tubular core drill 8 having diamond impregnated sections 9 mounted in its upper end at uniformly spaced intervals.

The base plate 5 is also provided with a series of arcuate slots 10, four such slots being used in the example shown, which extend between the openings 3. These arcuate slots are on the circle which passes through the axes of the openings 3.

The base plate 5 is secured to the adapter 1 by means of bolts 11, which extend through the slots 10 and are threaded into the openings 3, as best shown in FIG. 2.

In FIG. 1, the line A passes through the axis of the core drill 8 and the portion 1 of the spindle adapter, and the line B passes through the axis of the cam 2, and the circle to which reference has been made.

After the drill has been used for some time, it becomes worn. In order to compensate for this wear and to drill a slightly larger hole with the drill, the bolts 11 are loosened, and the base plate is rotated in relation to the adapter 1. Since the cam 2 is not concentric with the base plate, this rotation causes the drill 8 to be moved laterally or radially in relation to the adapter 1, so that a peripheral portion of the drill is enabled, after the bolts 11 are again tightened, to drill a hole of larger diameter, when the assembly is again rotated. In this manner, the wear of the drill is compensated for by drilling a larger hole.

It will be understood that the extent to which the drill is moved laterally is determined by the extent to which the base plate 5 is rotated in relation to the cam 2, and this, in turn, is limited by the length of the arcuate slots 10.

It is to be understood that the form of my invention, herewith shown and described, is to be taken as a preferred example of the same, and that various changes may be made in the shape, size and arrangement of parts thereof, without departing from the spirit of the invention or the scope of the subjoined claims.

Having thus described my invention, I claim:

1. In a drill assembly of the character described, a rotatable adapter having a circular cam in eccentric relation to the adapter, said cam having its axis parallel to the axis of rotation of said adapter, a drill mounted on said adapter and having an opening in eccentric relation to the drill and into which said cam extends, means permitting said drill to be rotated in relation to said cam whereby to cause the position of said drill to be adjusted laterally in relation to said adapter for the purpose of compensating for wear of the drill and for drilling a larger hole, and means for locking said drill to said adapter in adjusted position.

2. A drill assembly, as defined in claim 1, wherein said adapter is of circular configuration and said cam is also of circular configuration.

3. In a drill assembly of the character described, means for rotating a drill, said means having a cam in eccentric relation to and having an axis parallel to the axis of rotation of said means, a drill driven by said rotating means, said drill being movable laterally in response to relative rotation between said drill and said cam, and means for locking said drill against rotation relatively to said cam.

4. In a drill assembly of the character described, a rotatable adapter of circular configuration having a cam of circular configuration in eccentric relation to the adapter, a drill mounted on said adapter and comprising a base plate having a circular recess in eccentric relation to the drill and into which said cam extends, a cylindrical element secured to said base plate and having diamond impregnated inserts in one end thereof, and means permitting said drill to be rotated in relation to said cam whereby to cause the position of said drill to be adjusted laterally in relation to said adapter for the purpose of compensating for wear of the drill and drilling a larger hole.

5. A drill assembly, as defined in claim 4, wherein said adapter is provided with a multiplicity of circumferentially-spaced threaded openings, and said base plate is provided with a series of circumferentially-spaced arcuate slots.

6. A drill assembly, as defined in claim 5, including bolts for securing said drill to said adapter, said bolts extending through said slots and into said openings.

7. In a drill assembly of the character described, a driven member having a circular cam in eccentric relation to the axis of drive of said driven member, a drill mounted on said driven member and having a circular recess in eccentric relation to the axis of said drill and into which said cam extends, said cam having its axis parallel with said drive axis, said drill being rotatable relatively to said cam, whereby to cause said drill to be adjusted laterally in relation to said drive member for the purpose of compensating for wear of the drill and for drilling a larger hole, and means for clamping or locking said drill to said drive member in adjusted position.

8. A drill assembly, as defined in claim 7, wherein said last-named means comprises a series of circumferentially-spaced threaded openings in said driven member, a series of circumferentially-spaced arcuate slots in said drill, and bolts extending through said slots and into said threaded openings, said bolts having heads adapted to bear frictionally on said drill.

References Cited

UNITED STATES PATENTS

| | | | |
|---|---|---|---|
| 85,334 | 12/1868 | Sayles | 175—384 |
| 178,207 | 5/1876 | Twigg | 175—384 |
| 1,067,417 | 7/1913 | Erzig | 175—384 |
| 3,415,329 | 12/1968 | Marlind | 175—384 X |
| 1,071,157 | 8/1913 | Holt | 175—343 X |
| 1,414,840 | 5/1922 | Terrell | 175—292 X |
| 1,494,274 | 5/1924 | Morgan | 175—384 X |
| 1,805,727 | 5/1931 | Smith | 175—263 X |
| 1,858,263 | 5/1932 | Charlton | 175—292 |
| 1,972,068 | 8/1934 | Gill | 175—342 |
| 2,064,273 | 12/1936 | Scott | 175—342 X |
| 2,879,038 | 3/1959 | Johnson | 175—292 X |

NILE C. BYERS, JR., Primary Examiner

R. E. FAVREAU, Assistant Examiner

U.S. Cl. X.R.

175—403